A. CAHOON, Jr.
Spirit Level.
No. 35,298. Patented May 20, 1862.
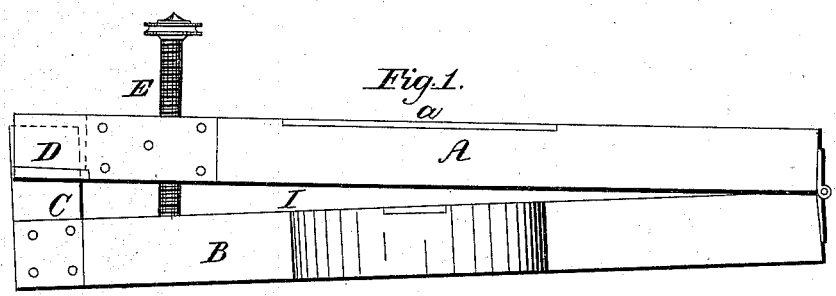
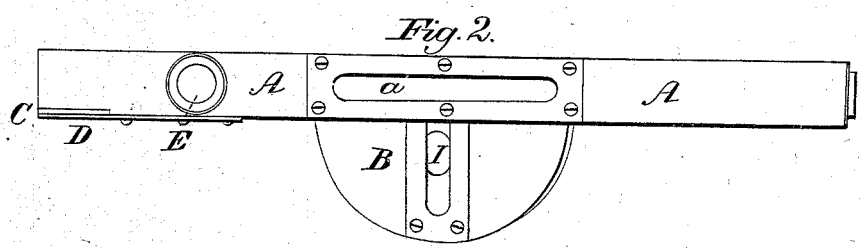
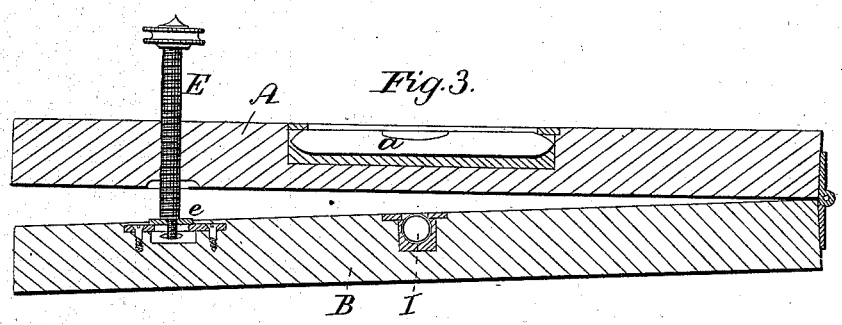
Witnesses.
Alvan Cahoon.
Samuel S. Cahoon.
Inventor.
Alvin Cahoon jr.

UNITED STATES PATENT OFFICE.

ALVIN CAHOON, JR., OF HARWICH, MASSACHUSETTS.

IMPROVEMENT IN COMBINED SPIRIT-LEVELS.

Specification forming part of Letters Patent No. 35,298, dated May 20, 1862.

*To all whom it may concern:*

Be it known that I, ALVIN CAHOON, Jr., of Harwich, in the county of Barnstable and State of Massachusetts, have invented a new and useful instrument for determining the trim of vessels, which I denominate a "Ploiometer;" and I do hereby declare that the following is a full and exact description of the same, reference being had to the accompanying drawings, in which—

Figure 1 is a side elevation. Fig. 2 is a plan view, and Fig. 3 is a vertical section.

Similar letters refer to like parts in all the figures.

In loading vessels it is obviously necessary to so stow the cargo that the vessel will stand upright or on an even keel. In all vessels there is also a certain relation between the draft in the water forward and aft, which is best suited to rapid motion, and which, varying with different vessels, it is important to ascertain by experiment and to conform to as nearly as possible. This is usually called the "sailing trim" or the "best sailing trim" of the vessel. The means generally employed to attain these objects have consisted in simply inspecting the position of the vessel in the water from the exterior, which is not only very deficient in accuracy, but occupies much time and is difficult of attainment. My instrument shows at a glance, or by a simple adjustment, the exact fore-and-aft trim of the vessel, as also whether it is on an even keel, and by its means the cargo can be readily stowed to produce any trim desired.

The nature of my invention consists in an improved instrument consisting of two horizontal spirit-levels at right angles one to the other, and one of them rendered adjustable in the vertical plane by means of a micrometer screw and scale or equivalent device, for the purpose of determining the position of a vessel in the water, both the "heel" and fore-and-aft "trim," and thereby indicate the proper disposition of the cargo for obtaining an even keel and the best sailing trim.

To enable others skilled in the art to which this invention relates to make and use the instrument, I will proceed to describe its construction and operation by the aid of the drawings.

A is a bar of wood carrying a spirit-level, *a*, attached in the ordinary manner.

B is a similar bar hinged to A at one end, as represented.

C is a graduated scale attached to B, and D is a pointer or vernier-scale attached to A to indicate the angle between A and B.

E is a screw threaded into A, and so attached to B by means of a collar and nut, *e*, as represented, that while it is free to turn on its axis and to slide laterally in B to a small extent to compensate for the variation in the angle B it is compelled to move either to or from A as E is turned in the corresponding direction without lost motion. A coiled spring to force A and B apart, with a screw to compress it and draw them together, or any other equivalent arrangement, may be used in place of the screw E, if desired. The bar B is widened at or near the center, as represented, and another spirit-level, I, placed therein at right angles to the level *a*.

In operating my invention a place is provided on the cabin-floor or at any convenient part of the vessel at right angles to the plane of the masts, on which the ploiometer is placed, with its length ranging fore and aft. When the vessel is trimmed to her best sailing condition, the part A is brought to a perfect level by means of the screw E, and the angle indicated on the scale C carefully noted. Now by placing the ploiometer in the same position and adjusted to the same angle when stowing cargo the level *a* will indicate her proper trim fore and aft, while the level I tells when she is on an even keel, and it is only necessary to stow the cargo in such a manner as to bring the bubble of each to its respective center point to produce the desired condition.

I do not claim, broadly, the employment of two spirit-levels at right angles one to the other, as such is well known in the ordinary spirit plumb and level. Neither do I claim rendering a spirit-level adjustable at small angles, as is shown in the rejected application of Henry Aston, 1856; but What I do claim as my invention, and desire to secure by Letters Patent, is—

The instrument herein described, consisting of two horizontal spirit-levels at right angles one to the other, and one of them rendered adjustable in the vertical plane for the purpose of determining the trim of a vessel, substantially as herein described.

In testimony whereof I have hereunto set my hand in the presence of two subscribing witnesses.

ALVIN CAHOON, JR.

Witnesses:
OBED BROOKS,
GEO. H. SNOW.